Figure 1:
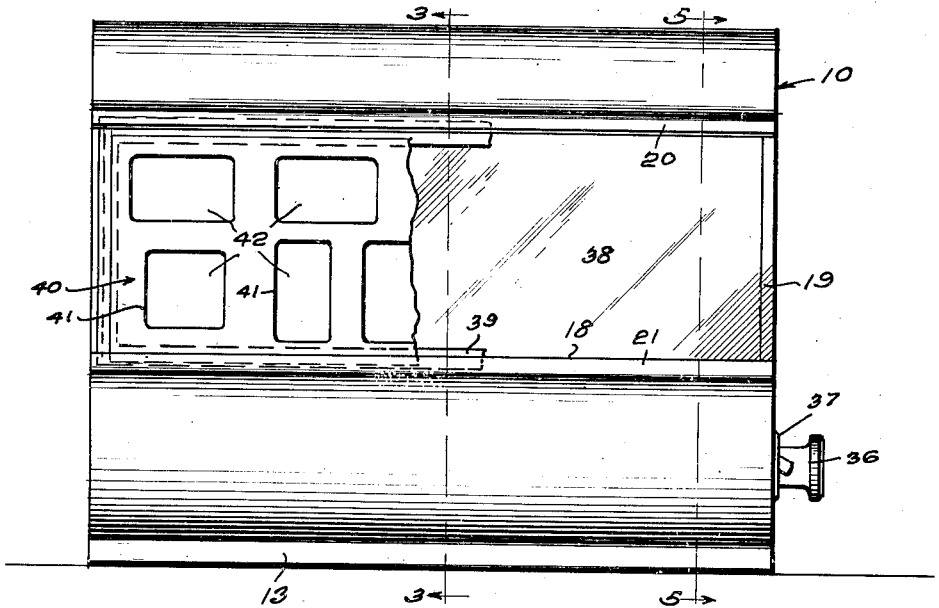

Feb. 23, 1932.　　　W. S. THOMPSON　　　1,846,533
OPTICAL DEVICE
Original Filed Oct. 8, 1929　2 Sheets-Sheet 1

INVENTOR.
WALTER S. THOMPSON,
BY
ATTORNEY.

Feb. 23, 1932.   W. S. THOMPSON   1,846,533
OPTICAL DEVICE
Original Filed Oct. 8, 1929   2 Sheets-Sheet 2
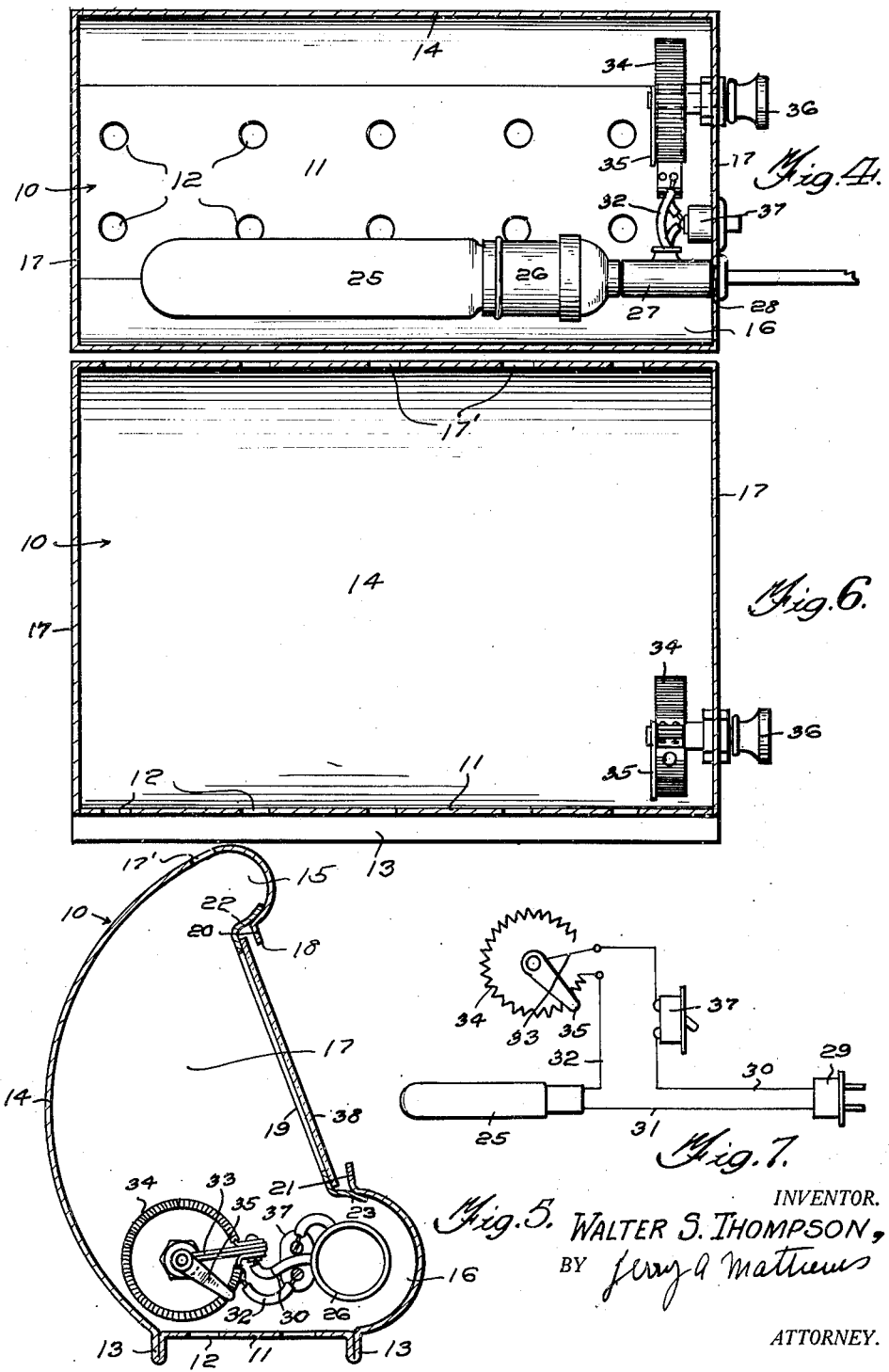
INVENTOR.
WALTER S. THOMPSON,
BY Jerry A. Matthews
ATTORNEY.

Patented Feb. 23, 1932

1,846,533

UNITED STATES PATENT OFFICE

WALTER S. THOMPSON, OF LOS ANGELES, CALIFORNIA

OPTICAL DEVICE

Application filed October 8, 1929, Serial No. 398,222. Renewed April 24, 1931.

My invention relates to optical devices, and has particular reference to such a device to be used in connection with the reading of X-ray films, such as dental X-ray films or the like.

In accordance with my invention, means are provided to effect the indirect illumination of the X-ray film by artificial light. The intensity of the light may be regulated, and a flat white reflecting surface is used to effect the indirect illumination which renders it possible to accurately read the X-ray film.

I provide a casing having a window upon one side to receive the X-ray film or films. A chamber or pocket is disposed near one side of the window. An electrical bulb is mounted within the pocket. The bulb is preferably elongated so that it is properly covered by the pocket, to produce indirect illumination of the X-ray film. The back of the casing is preferably vertically curved, and is disposed opposite the bulb and is adapted to reflect the light forwardly upon the film. At the opposite side of the window is preferably provided a second pocket or chamber, serving as a light reflector. The reflecting surfaces are so constructed that the reflected light is distributed uniformly, as much as possible, over the entire area of film or films. The reflecting surfaces are coated with a flat white surface, such as a flat white Duco. I have found that highly satisfactory results are obtainable by having these white reflecting surfaces in the form of a white flat coating, as distinguished from a polished metal surface or a glazed surface. The window is preferably covered by a section of clear transparent glass, (not colored or frosted glass). By the use of the glass, a suitable support is had for the mat and X-ray film mount, and a clear vision is afforded. Satisfactory results can be obtained by omitting the glass. The X-ray mount may be positioned upon the glass for inspection, and I may also use a mat to cover the edges of the mount to prevent light from passing about the edges of the mount. The side of the casing provided with the window is regarded as the forward side, since the rays of light are reflected in that direction, and the upper and lower pockets bulge forwardly beyond the window, and forwardly beyond the film holding means.

The current supplied to the bulb is regulated by means of a rheostat, whereby a light of the proper intensity may be had. It is thus seen that I have provided an optical device wherein the light is uniformly distributed over the entire area of the X-ray film or films, and wherein the intensity of the light may be properly varied. Further, the white flat reflecting surface, producing the indirect illumination of the film provides a light which is particularly well adapted for use in connection with the X-ray film, in accurately defining the white and black images present upon the film. By the use of my device, an X-ray film may be accurately read by an experienced interpreter and a proper diagnosis given.

The device is simple in construction, relatively small, compact, and neat and attractive in appearance.

Means are provided for the proper ventilation within the casing to allow of the escape of heat, whereby the X-ray films and mount will not become warped or injured.

Figures 2, 3:
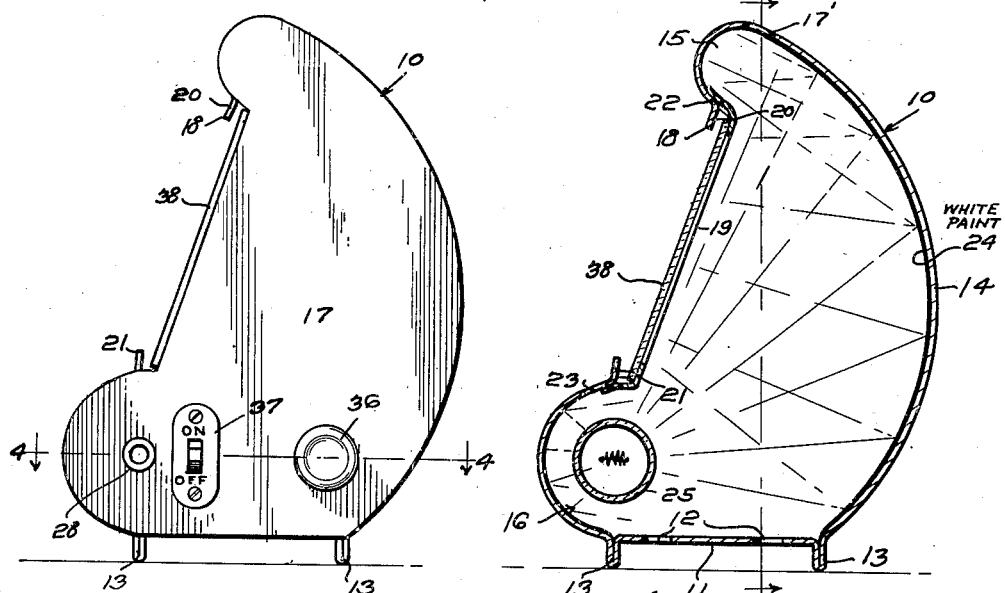

In the accompanying drawings, forming a part of his specification, and in which like numerals are employed to designate like parts throughout the same, Figure 1 is a front elevation of an optical device embodying my invention, Figure 2 is an end elevation of the same, Figure 3 is a transverse vertical section taken on line 3—3 of Figure 1, Figure 4 is a horizontal section taken on line 4—4 of Figure 2, Figure 5 is a transverse section taken on line 5—5 of Figure 1, Figure 6 is a longitudinal vertical section taken on line 6—6 of Figure 3, and, Figure 7 is a diagrammatic view of the electric circuit included in the device.

In the drawings, wherein for the purpose of illustration is shown a preferred embodiment of my invention, the numeral 10 designates a casing as a whole, which may be formed of sheet metal or any other suitable material. This casing embodies a flat horizontal bottom 11, having longitudinal row or rows of air inlet openings 12. Bent from the material of the casing 10 are longitudinal ribs or legs 13, serving to hold the bottom 11 spaced from the table or the like, whereby air may readily pass to the openings 12, the space between the legs 13 being uncovered at its ends, as clearly shown in Figure 2. The casing embodies a back 14, serving as a reflector, and this back is vertically curved in the form of a parabolic curve. At its top, the back terminates in a forwardly bulging pocket or recess 15. At its bottom, the casing embodies a forwardly bulging horizontal pocket or recess 16, for the reception of an electric bulb, to be described. The casing further embodies vertical ends 17, as shown. In its top, the casing is provided with a longitudinal set or sets of air outlet openings 17', for the escape of heated air. It is thus seen that the lower and upper openings 12 and 17' provide a continuous circulation of air through the casing, thereby affording proper ventilation and preventing overheating so that the mount and X-ray films will not be warped or injured by excessive heat.

At its front side, the casing has a main window or opening 18, and inwardly projecting flanges 19, at the ends thereof. These flanges are slightly inclined from the vertical toward the back 14. An upper retaining horizontal flange 20 is formed upon the lower end of the pocket 15 and a lower horizontal retaining flange 21 is formed upon the top of the lower pocket 16. A supporting strip 22 is secured to the inner side of the pocket 15 and is spaced from the flange 20 and a supporting strip 23 is secured to the pocket 16 and spaced from the flange 21. These flanges and strips constitute guides for receiving the X-ray films and associated element or elements, to be described. The plane of the window is, therefore, inclined slightly from the vertical toward the back 14.

I have found that the most satisfactory results are obtained by having the entire interior surface of the casing, which serves as a reflector, covering with a white flat coat, as distinguished from a polished metal surface or a glazed surface. The white flat coat is indicated at 24, and may be white flat paint, such as Duco. The back 14, pockets 15 and 16, and ends 17 have their surfaces covered with this white flat coat. The white flat coat serves as a reflecting surface and produces a white light which is very beneficial in reading X-ray films, which embody black and white images varying in different degrees of intensity.

The numeral 25 designates an electric bulb, which is relatively long and has a relatively small diameter and extends throughout the major portion of the length of the lower pocket 16, within which it is mounted. Particular attention is called to the fact that the bulb 25 is arranged wholly within the forwardly bulging pocket 16 and hence it illuminates the X-ray film by indirect light, reflected from the white flat reflecting surfaces. The bulb 25 is carried by a socket 26, secured to a tubular stem 27, passing through an opening 28 in the end 17, and rigidly held therein by any suitable means.

The usual electric light plug 29 is secured to the ends of wires 30 and 31. The wire 31 extends through the tubular stem 27 and is connected with one terminal of the socket 26, while the other terminal of the socket 26 is connected with a wire 32. The wire 32 is electrically connected with a resistance coil 34 of a rheostat, which coil is insulated from the connecting arm 33. The arm 33 is in electrical connection with a pivoted contact arm 35, to travel in engagement with the resistance coil 34. The contact 35 is turned by means of a knob 36 arranged upon the exterior of the casing. The arm 33 is connected with the wire 30. A switch 37 is connected in the wire 30, to open and close the circuit. It is thus seen that a circuit may be closed to cause the bulb 25 to glow and the intensity of the light from the bulb may be properly varied by adjusting the rheostat. This is an important feature of the invention, as it has been found that a light of different intensity should be used in connection with X-ray films of different character or different black and white photographic texture.

The window 18 is preferably covered by a clear transparent section of glass 38, which is not frosted or colored. This glass rests upon the strips 22 and 23. The use of the glass is preferred, as it forms a convenient support for the mat and X-ray film mount, and being transparent, provides a clear vision. However, the glass 38 may be dispensed with, if desired. The numeral 39 designates a mat, to be arranged upon the glass 38 and disposed inwardly of the flanges 20. This mat is preferably formed of thin metal. The numeral 40 designates a mount having openings 41, covered by the X-ray films 42, which are secured to the mount by any suitable means. I preferably form the mount of black fibre. The mount is arranged upon the mat 39 and covers the opening of the mat. The mat is employed to prevent light passing about the edges of the mount.

In the use of the optical device, the mat is arranged upon the glass 38 and the mount 40 carrying the X-ray films 42 is arranged upon the mat. The switch 37 is actuated to close the circuit and the bulb 25 will then glow. The intensity of the light is regulated by the adjustment of the rheostat. The light from the bulb 25 does not directly strike upon the X-ray films but is projected rearwardly and upwardly upon the flat white reflecting surfaces and then reflected forwardly through the X-ray films. The manner of reflection is indicated by the lines in Figure 3. The reflecting surfaces of the upper and lower pockets 15 and 16 reflect the light rearwardly upon the back 14, which in turn reflects the same forwardly through the film. This aids in the uniform distribution of the light. By virtue of the arrangement of the bulb 25 within the pocket 16 and the reflecting surfaces, an indirect illumination is provided for the film, and the light is uniformly distributed over the surfaces of the film. With the uniform distribution of the light, its control, and the flat white reflecting surfaces, the X-ray films may be read with accuracy and a proper diagnosis given.

It is to be understood that the form of my invention, herewith shown and described, is to be taken as a preferred example of the same, and that various changes in the shape, size and arrangement of parts, may be resorted to without departing from the spirit of my invention, or the scope of the subjoined claims.

Having thus described my invention, I claim:—

1. An optical device to be used in connection with reading X-ray films, comprising a casing provided in its forward side with a window and having its opposite rear side in the form of a parabolic curve, film holding means arranged adjacent to the window, a lower outwardly bulging pocket formed at the bottom of the window and projecting forwardly beyond the film holding means, an upper outwardly bulging pocket formed at the top of the window and projecting forwardly beyond the film holding means, said casing and pockets having their surfaces covered with a flat white reflecting coat, an electric bulb arranged within the lower pocket and sufficiently covered thereby to prevent the direct projection of light upon the film, the upper pocket being empty, so that it serves as a reflecting surface to reflect rays of light back upon the parabolic curve, and means for supplying current to the bulb.

2. An optical device to be used in connection with reading X-ray films, comprising a generally vertical casing having a forward side which is inclined rearwardly toward its upper end, and an opposite rear side in the form of a parabolic curve, film holding means arranged adjacent to the window, a lower outwardly bulging pocket formed at the bottom of the window and projecting forwardly beyond the film holding means, an upper outwardly bulging pocket formed at the top of the window and projecting forwardly beyond the film holding means, said casing and pocket having their surfaces constituting reflectors, an electric bulb arranged within the lower pocket and sufficiently covered thereby to prevent a direct projection of light upon the film, the upper pocket being empty, so that it reflects rays of light back upon the parabolic curve, and means for supplying current to the bulb.

3. An optical device to be used in connection with reading X-ray films, comprising a casing having a forward side provided with a window and an opposite rear side in the form of a parabolic curve, film holding means arranged adjacent to said window, a lower generally horizontal outwardly bulging pocket formed at the bottom of the window, said pocket being curved in vertical cross-section and projecting forwardly beyond the film holding means, an upper generally horizontal outwardly bulging pocket formed at the top of the window, said upper pocket being curved in vertical cross-section and projecting forwardly beyond the film holding means, the pockets and rear side of the casing serving as reflecting surfaces, an electric bulb arranged within the lower pocket and sufficiently covered thereby to prevent the direct projection of light upon the film, and means for supplying current to the bulb.

4. An optical device to be used in connection with reading X-ray films, comprising a casing provided in its forward side with a window, having its opposite rear side in the form of a parabolic curve, film holding means arranged adjacent to the window, a lower outwardly bulging pocket formed at the bottom of the window and projecting forwardly beyond the film holding means, an electric bulb arranged within the outwardly bulging pocket and sufficiently covered thereby to prevent the direct projection of light upon the film, the inner surfaces of the rear side and outwardly bulging pocket serving as reflecting surfaces, and means for supplying current to the bulb.

5. An optical device to be used in connection with X-ray films, comprising a casing provided in its forward side with a window and having an oppositely arranged upstanding rear side which is curved in one direction and straight in a direction at a right angle to the first-named direction, film holding means arranged adjacent to the window, an outwardly bulging pocket formed near the bottom of the window and projecting forwardly beyond the window, the inner surface of the rear side being treated to reflect light without producing a glare, an electric bulb arranged within the lower pocket and sufficiently covered thereby to prevent the direct projection of light upon the film, and means for supplying current to the bulb.

6. An optical device to be used in connection with reading X-ray films, comprising a casing having a forward side provided with a window and a rear side, said rear side being curved in one direction and straight in a direction disposed generally at a right angle to the first-named direction, the forward side being inclined rearwardly toward its top, means to support the film at the window and holding the same so that it is inclined rearwardly toward the top, an outwardly bulging pocket formed near the window and projecting forwardly beyond the window, an electric bulb arranged within the pocket and sufficiently covered thereby to prevent the direct projection of light upon the film, the inner surfaces of the rear side and outwardly bulging pocket serving as reflecting surfaces, and means to supply current to the bulb.

7. An optical device to be used in connection with reading X-ray films, comprising a casing having forward and rear sides, the forward side having an elongated window, and the rear side being straight in a direction longitudinally of the window and curved in a direction transversely of the window, film holding means arranged near the window and inclined rearwardly toward its top, an outwardly bulging pocket arranged near and upon one side of the window and projecting forwardly beyond the window, an electric bulb arranged within the pocket and sufficiently covered thereby to prevent the direct projection of light upon the film, the inner surfaces of the rear side and the pocket serving as reflecting surfaces.

8. An optical device to be used in connection with reading X-ray films, comprising a casing having a forward and rear side, the forward side having a substantially horizontal window formed therein and the rear side being straight in a horizontal direction and curved in a vertical direction, means for holding the film across the window, a pocket carried by the forward side and arranged upon one side of the window and projecting forwardly beyond the window, the inner surface of the rear side being treated so that it reflects the light without producing a glare, an electric bulb arranged within the bulging pocket and sufficiently covered thereby to prevent the direct projection of light upon the film, and means to supply current to the bulb.

9. An optical device to be used in connection with reading X-ray films, comprising a substantially rectangular casing having a forward and rear side, the forward side having a substantially rectangular window formed therein and the rear side being straight in one direction and curved in a direction at substantially a right angle to the first-named direction so that this rear side is adapted to reflect light substantially uniformly throughout the entire area of the window, means for holding the film across the window, a pocket carried by the forward side and arranged upon one side of the window, the inner surface of the rear side being treated so that it reflects the light without producing a glare, an electric bulb arranged within the pocket and sufficiently covered thereby to prevent the direct projection of light upon the film, and means to supply current to the bulb.

In testimony whereof I affix my signature.

WALTER S. THOMPSON.